US009338340B2

(12) United States Patent
Freund

(10) Patent No.: US 9,338,340 B2
(45) Date of Patent: May 10, 2016

(54) LAUNCHING A CAMERA OF A WIRELESS DEVICE FROM A WEARABLE DEVICE

(71) Applicant: Google Technology Holdings LLC, Mountain View, CA (US)

(72) Inventor: Jason Freund, Cupertino, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/332,478

(22) Filed: Jul. 16, 2014

(65) Prior Publication Data

US 2016/0021291 A1 Jan. 21, 2016

(51) Int. Cl.
*H04N 5/232* (2006.01)
*G06F 1/16* (2006.01)

(52) U.S. Cl.
CPC ............ *H04N 5/23206* (2013.01); *G06F 1/163* (2013.01); *H04N 5/23216* (2013.01); *H04N 5/23203* (2013.01)

(58) Field of Classification Search
None
See application file for complete search history.

(56) References Cited

U.S. PATENT DOCUMENTS

| 7,618,260 | B2 | 11/2009 | Daniel et al. |
| 8,289,162 | B2 | 10/2012 | Mooring et al. |
| 2010/0124949 | A1* | 5/2010 | Demuynck ........... G06F 1/1626 455/569.1 |
| 2011/0018794 | A1 | 1/2011 | Linsky et al. |
| 2013/0293494 | A1* | 11/2013 | Reshef ..................... G06F 3/016 345/173 |
| 2015/0031348 | A1* | 1/2015 | Lee ......................... H04B 1/385 455/418 |
| 2015/0145653 | A1* | 5/2015 | Katingari ................ G06F 1/163 340/12.3 |
| 2015/0187206 | A1* | 7/2015 | Saurin ..................... G08C 17/02 340/5.61 |
| 2015/0215514 | A1* | 7/2015 | Barabas ............. H04N 5/23203 348/211.2 |

FOREIGN PATENT DOCUMENTS

JP 2009-118474 * 5/2009

* cited by examiner

*Primary Examiner* — Justin P Misleh
(74) *Attorney, Agent, or Firm* — Shumaker & Sieffert, P.A.

(57) ABSTRACT

A system includes a wearable device (102) such as a smartwatch and a wireless device (104) such as a smartphone. A user provides to the wearable device a user input indicating a user desire to launch a camera of the wireless device. The wearable device is separate from the wireless device but communicates wirelessly with the wireless device. The user input can take various forms such as a particular gesture (e.g., the user shaking his or her wrist back and forth twice). In response to the user input, an indication is sent to the wireless device to launch the camera of the wireless device. In response to receipt of the indication from the wearable device, the wireless device launches the camera of the wireless device.

21 Claims, 5 Drawing Sheets

LAUNCHING A CAMERA OF A WIRELESS DEVICE FROM A WEARABLE DEVICE

BACKGROUND

As technology has advanced, wireless devices such as cellular phones have advanced, resulting in modern devices that provide a large amount of functionality. One type of functionality provided by these devices is camera functionality, allowing images to be captured and saved by the devices. While providing a large amount of functionality results in devices with numerous different features desired by users, this functionality is not without its problems. One such problem is that the operation of this functionality can be slow due to slow components being used in the device (e.g., used to reduce the financial cost or energy consumption of these devices). This slow operation can reduce the user friendliness of devices and increase user frustration with devices.

BRIEF DESCRIPTION OF THE DRAWINGS

Embodiments of launching a camera of a wireless device from a wearable device are described with reference to the following drawings. The same numbers are used throughout the drawings to reference like features and components.

DETAILED DESCRIPTION

Launching a camera of a wireless device from a wearable device is discussed herein. Using the techniques discussed herein, a user provides a user input to a wearable device such as a watch, the user input indicating a user desire to launch a camera of a wireless device. The wearable device is separate from the wireless device but communicates wirelessly with the wireless device. The user input can take various forms such as a particular gesture (e.g., the user shaking his or her wrist back and forth twice). In response to the user input, an indication is sent to the wireless device to launch the camera of the wireless device. In response to receipt of the indication from the wearable device, the wireless device launches the camera of the wireless device. Launching the camera of the wireless device refers to taking various actions to allow the wireless device to begin capturing images, such as running a camera program on the wireless device, opening a shutter of the wireless device, and so forth.

Thus, the user is able to use the wearable device to provide an indication to the wireless device to get ready to take a picture. The indication is provided to the wireless device via a wireless communication channel. Accordingly, the user may be some distance (e.g., several feet) away from the wireless device and provide the user input to the wearable device, resulting in the wireless device being ready to capture images by the time the user walks to and picks up the wireless device.

Figure 1:
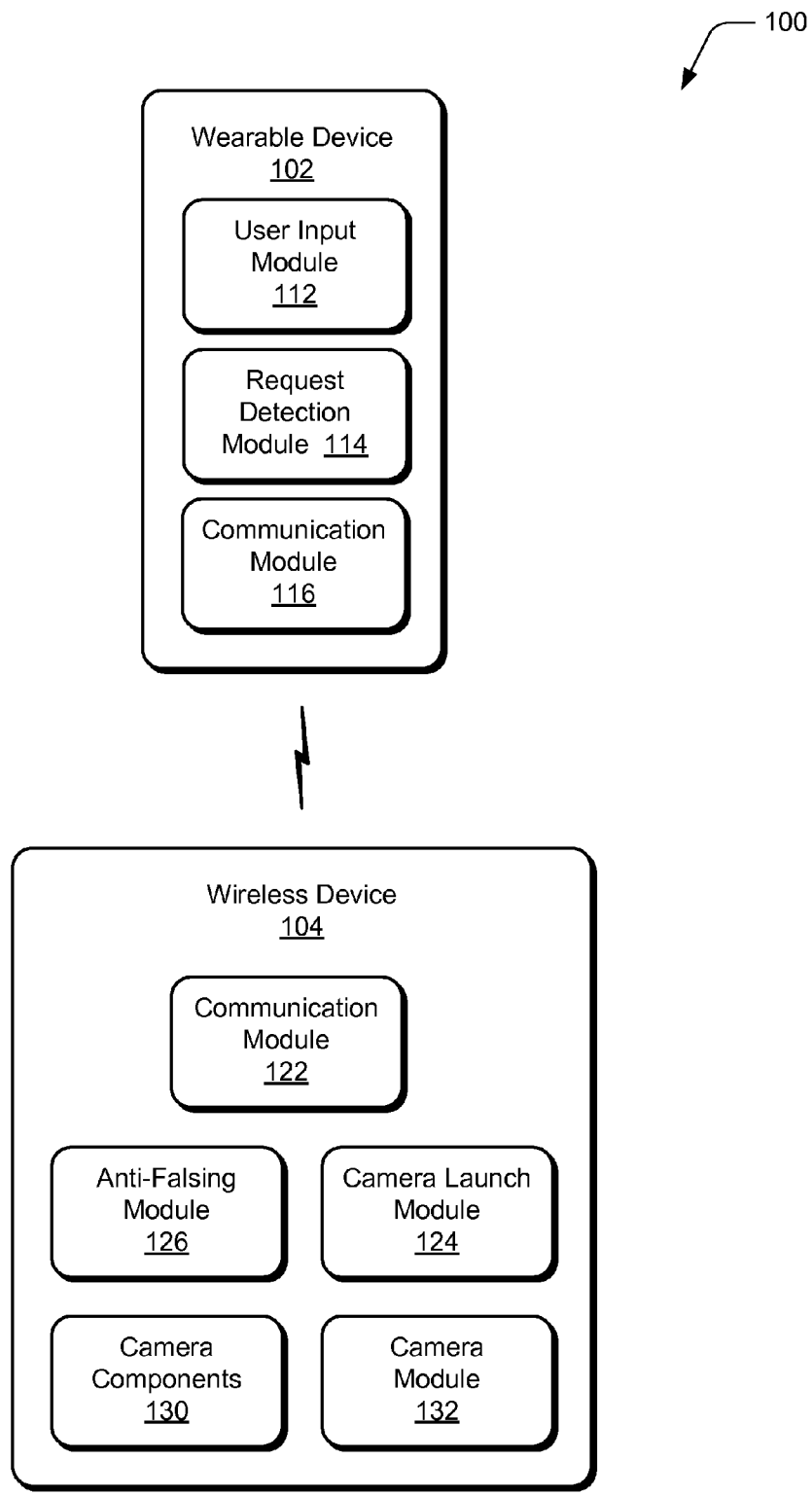
FIG. 1 illustrates an example system implementing launching a camera of a wireless device from a wearable device in accordance with one or more embodiments.

FIG. 1 illustrates an example system 100 implementing launching a camera of a wireless device from a wearable device in accordance with one or more embodiments. The environment system 100 includes a wearable device 102 and a wireless device 104. The wearable device 102 is a computing device having a form factor that allows the device to be worn by a user, such as being jewelry, clothing, or another accessory of the user. Being a computing device, the wearable device 102 can include a processor, run various programs, display a user interface, and so forth. In one or more embodiments the wearable device 102 is a smartwatch (a computing device in a wristwatch form factor). Alternatively the wearable device 102 is one of multiple other types of devices, such as a ring or other jewelry, eyeglasses, and so forth.

The wireless device 104 is another computing device that is a separate device from the wearable device 102 and includes camera functionality (the ability to capture images). In one or more embodiments, the wireless device 104 is a cellular or other wireless phone such as a smartphone. Alternatively, the wireless device 104 can be other devices that include image capture functionality, such as a tablet device, a phablet device, and so forth.

The wearable device 102 includes a user input module 112, a request detection module 114, and a communication module 116. The user input module 112 allows user inputs to be provided to the wearable device requesting various different functionality be performed. The user inputs can take various forms, such as actuation of a physical button or switch of the wearable device 102, selection of an icon or other object displayed on a screen of the wearable device 102, a particular touch sequence or pattern traced on or over a touchscreen of the wearable device 102, an audible input received by a microphone of the wearable device 102, a movement or sequence of movements (e.g., also referred to as a gesture) of the wearable device 102 detected by the wearable device 102 (e.g., detected by accelerometers or gyroscopes of the wearable device 102), and so forth.

The request detection module 114 analyzes user inputs received by the wearable device 102 and detects when a user input is a user input indicating a user desire to launch a camera of the wireless device 104. Various different user inputs can be used to indicate a user desire to launch a camera of the wireless device 104, such as shaking the wearable device 102 back and forth twice, in the case of a wearable device 102 that is a wristwatch rotating the wrist that the watch is on back and forth twice, and so forth. In one or more embodiments the user input indicating a user desire to launch a camera of the wireless device 104 is a gesture, although the user input can be any of a variety of other user inputs that can be provided to the user input module 112 (e.g., a particular touch sequence or pattern traced on or over a touchscreen of the wearable device 102, an audible input received by a microphone of the wearable device 102, and so forth). The particular user input that is used to indicate a user desire to launch a camera of the wireless device 104 can vary by implementation, and can optionally be specified by the user of the wearable device 102. For example, the user may be able to select from a set of multiple user inputs one input that is used to indicate a user desire to launch a camera of the wireless device 104.

In one or more embodiments, the request detection module 114 is a low power sensor hub, detecting a user input indicating a user desire to launch a camera of the wireless device 104 using low power sensors or sensing components. Examples of such low power sensors include accelerometers, gyroscopes, and so forth that detect motion of the wearable device 102. Thus, the request detection module 114 is able to monitor movement of the wearable device 102 while the wearable device 102 is in a low power mode (e.g., various components are sleeping, no user interface is being displayed on a display screen of the wearable device).

The communication module 116 allows signals to be sent to, and optionally received from, the wireless device 104. Various different communication protocols can be implemented by the communication module 116, such as the Bluetooth Core Specification version 4.0 (Bluetooth 4.0) or the Bluetooth 4.1 specification, near field communication (NFC) protocols, Wi-Fi protocols, and so forth.

In response to detecting the user input indicating a user desire to launch a camera of the wireless device 104, the request detection module 114 notifies the communication module 116 to send an indication to the wireless device 104 to launch a camera of the wireless device 104. In one or more embodiments, the wireless device 102 includes a chipset supporting a low power wireless connection with the wireless device 104, such as a connection in accordance with the Bluetooth 4.0 or 4.1 specification.

The wireless device 104 includes a communication module 122, a camera launch module 124, an anti-falsing module 126, camera components 130, and a camera module 132. The communication module 122 implements at least one of the same communication protocols as the communication module 116, allowing the wearable device 102 and the wireless device 104 to communicate with one another. The camera launch module 124 launches the camera of the wireless device 104 in response to an indication received from the wearable device 102 that a user input at the wearable device 102 indicates a user desire to launch the camera. Launching the camera of the wireless device refers to taking various actions to allow the wireless device 104 to begin capturing images as discussed in more detail below.

The camera components 130 include one or more components that allow images to be captured by the wireless device 104. The camera components 130 can include, for example, a shutter, a diaphragm or other component to control an aperture size, a lens, a flash, an imaging sensor, and so forth. The camera module 132 manages or controls camera functionality of the wireless device 104 including controlling the camera components 130 to capture images. The captured images can be still photos or video. The wireless device 104 can optionally include a microphone to capture audio input as part of the camera functionality (e.g., capture audio accompanying captured video). The camera of the wireless device 104 refers to the camera components 130 as well as the camera module 132, and optionally also refers to functionality provided by other modules or components of the wireless device 104 (e.g., the anti-falsing module 126).

The anti-falsing module 126 operates to detect false indications of a user desire to launch a camera of the wireless device 104. A false indication of a user desire to launch a camera of the wireless device 104 refers to an indication of a user desire to launch a camera of the wireless device 104 being received even though the user does not actually desire to launch the camera of the wireless device 104. Such false indications can be received due to a variety of different events, such as an incorrect detection of a user input by the request detection module 114.

Although various different individual modules 112-116, 122-126, and 132 are illustrated, multiple ones of modules 112-116, 122-126, and 132 can be combined into a single module, functionality of one or more modules 112-116, 122-126, and 132 can be implemented by another of the modules 112-116, 122-126, and 132, one or more modules 112-116, 122-126, and 132 can be separated into multiple modules, and so forth. For example, anti-falsing module 126 can be implemented at least in part in camera module 132. Modules 112-116, 122-126, and 132 can each be implemented in software, firmware, hardware, or combinations thereof.

Figure 2:
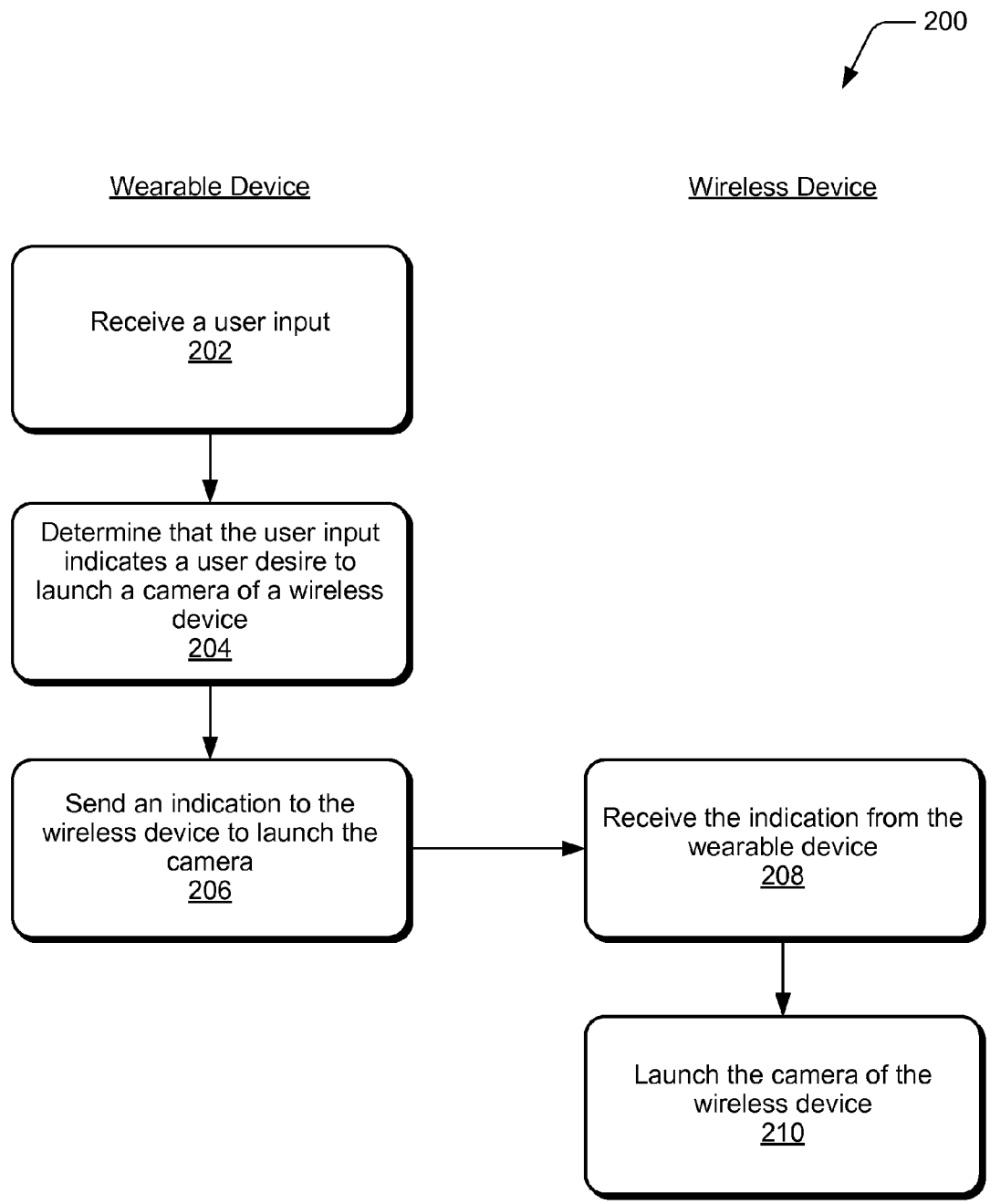
FIG. 2 illustrates an example process for launching a camera of a wireless device from a wearable device in accordance with one or more embodiments.

FIG. 2 illustrates an example process 200 for launching a camera of a wireless device from a wearable device in accordance with one or more embodiments. Process 200 is carried out at least in part by a wearable device such as wearable device 102 of FIG. 1 and a wireless device such as wireless device 104 of FIG. 1, and can be implemented in software, firmware, hardware, or combinations thereof. Process 200 is shown as a set of acts and is not limited to the order shown for performing the operations of the various acts. Acts of process 200 implemented by a wearable device are illustrated on the left-hand side of FIG. 2, and acts of process 200 implemented by the wireless device are illustrated on the right-hand side of FIG. 2.

In process 200 a user input is received at the wearable device (act 202). Various different user inputs can be received that request or invoke various functionality of the wearable device. One such user input is a user input indicating a user desire to launch a camera of the wireless device as discussed above.

The wearable device determines that the user input indicates a user desire to launch a camera on a wireless device (act 204). Different user inputs can be received that request or invoke various functionality of the wearable device, and the user input being one that indicates a user desire to launch a camera on a wireless device is determined in act 204.

In response to the user input being determined to indicate a user desire to launch a camera on a wireless device, an indication to launch the camera on the wireless device is sent to the wireless device (act 206). This indication can take various different forms, such as a signal, message, or other notification. In one or more embodiments, a low power wireless communication connection (e.g., in accordance with a Bluetooth specification, such as Bluetooth version 4.0) is maintained between the wearable device and the wireless device, and the indication is sent via this communication connection.

The wireless device receives the indication to launch a camera from the wearable device (act 208). In response to the received indication, the wireless device launches the camera of the wireless device (act 210). Launching the camera of the wireless device refers to taking various actions to allow the wireless device to begin capturing images, effectively "starting up" the camera functionality of the wireless device so that the wireless device can capture an image as soon as the user selects a shutter release or otherwise requests an image be captured. Launching the camera of the wireless device can include various different actions. For example, launching the camera can include running a camera program (e.g., camera module 132 of FIG. 1), opening a lens cover, opening a shutter, setting a diaphragm or other component to control an aperture size, extending a lens, powering up a flash, activating an imaging sensor, and so forth. The particular actions taken to launch the camera can vary by implementation.

In one or more embodiments, launching a camera of the wireless device includes performing the actions typically performed when a camera program of the wireless device is requested to be run by the user. However, no such user request is received at the wireless device using the techniques discussed herein; rather, the user input is provided to the wearable device.

The user is thus able to have the wireless device launch the camera of the wireless device even though the user is not touching the wireless device and prior to the user touching the wireless device in order to use the camera of the wireless device. For example, the user can provide an input to the wearable device indicating a user desire to launch the camera on the wireless device while the user is some distance (e.g., several feet) away from the wireless device. The wearable device signals the wireless device to launch the camera of the wireless device, so the wireless device is ready to capture images by the time the user grabs the wireless device. By way of another example, the user can provide an input to the wearable device indicating a user desire to launch the camera on the wireless device while the wireless devices is in the user's pocket or purse. The wearable device signals the wireless device to launch the camera of the wireless device, so the wireless device is ready to capture images by the time the user removes the wireless device from the user's pocket or purse.

Figure 3:
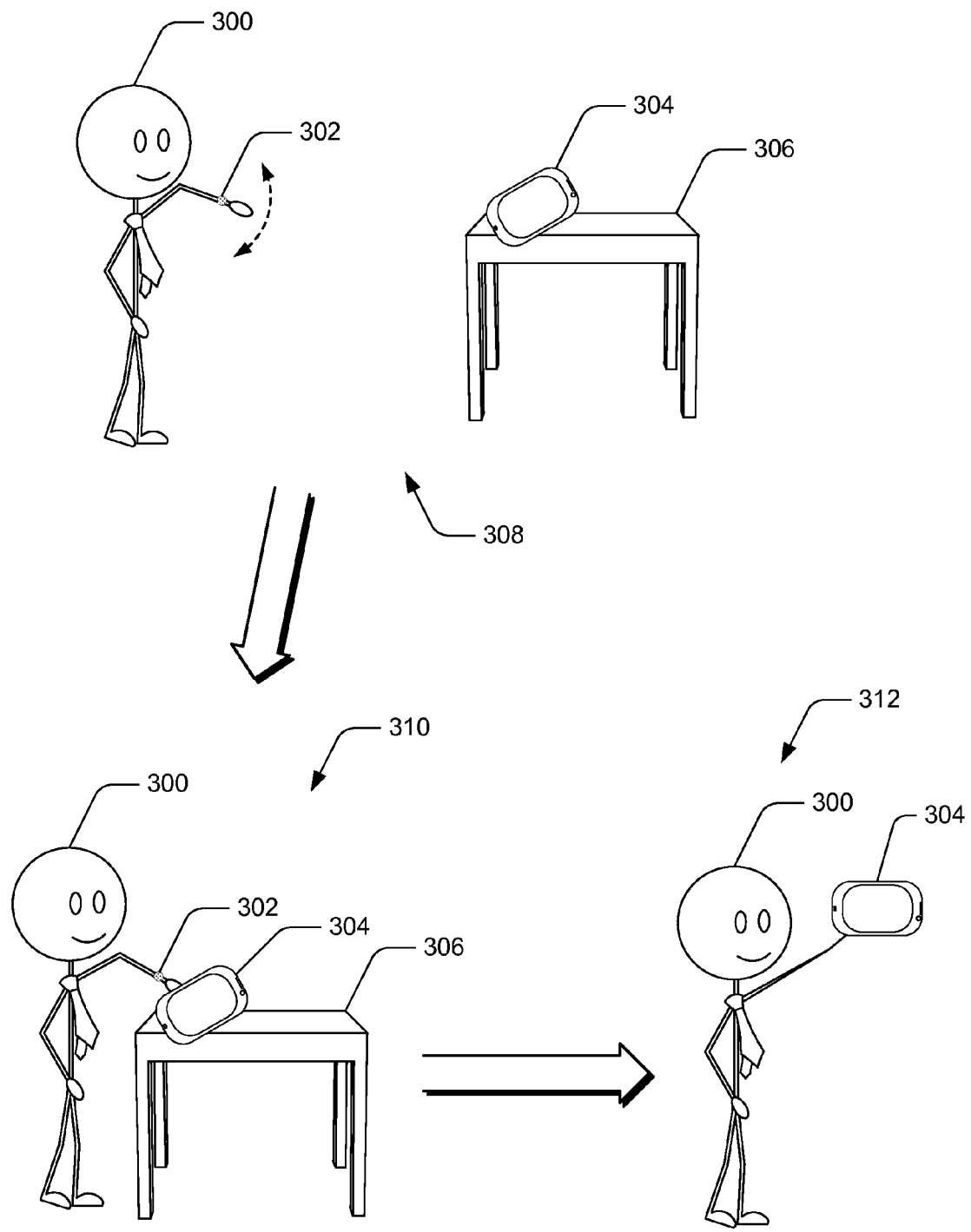
FIG. 3 illustrates an example usage of the techniques discussed herein.

FIG. 3 illustrates an example usage of the techniques discussed herein. A user 300 has a wearable device that is a smartwatch 302, and a separate wireless device that is a smartphone 304 resting on a table 306. At 308, when the smartwatch 302 is within range of the smartphone 304, the user shakes his or her wrist back and forth twice to provide a user input indicating that the user 300 desires to launch the camera on the smartphone 304. The smartwatch 302 being within range of the smartphone 304 refers to the smartwatch 302 being physically close enough to the smartphone 304 so that the smartwatch 302 can communicate a signal to the smartphone (e.g., by way of communication modules 116 and 122 of FIG. 1) indicating a user desire to launch the camera on a wireless device.

In response to the user input indicating that the user 300 desires to launch the camera on the smartphone 304, the smartphone 304 launches the camera of the smartphone 304 while the user 300 walks towards the table 306.

At 310, the user has reached the table 306 and picks up the smartphone 304. As the camera on the smartphone 304 has been launched, the user 300 can proceed at 312 to take a picture with the smartphone. The user need not wait at 312 for the camera of the smartphone 304 to be launched because the camera of the smartphone 304 was launched prior to the user picking up or otherwise touching the smartphone 304 (while the user was walking towards the table 306) in order to use the camera of the smartphone 304.

Returning to FIG. 1, although the techniques discussed herein are discussed with reference to launching a camera of the wireless device 104, the techniques discussed herein can analogously be used to launch other functionality of the wireless device, such as launching audio recording functionality, launching music playback functionality, and so forth. Different user inputs to the wearable device 102 can be associated with different functionalities, each such user input causing an indication to launch the associated functionality on the wireless device 104.

Similarly, the camera of the wireless device 104 can operate in different operational modes, each different mode indicating a manner in which the camera operates to capture images. Examples of such different operational modes include a still photo mode in which the camera captures still images, a video mode in which the camera captures video, a still photo low light mode in which the camera captures still images with use of a flash, a still photo fast shutter speed mode in which the camera captures still images at a short or high shutter speed (e.g., 1/500 second or faster), and so forth. Different user inputs to the wearable device 102 can be associated with different ones of these operational modes, each such user input causing an indication to launch the camera functionality in the associated operational mode on the wireless device 104. For example, a user input that is shaking the wearable device 102 back and forth twice can be a user input indicating to launch the camera of the wireless device 104 in a still photo mode, and a user input that is shaking the wearable device 102 back and forth three times can be a user input indicating to launch the camera of the wireless device 104 in a video mode.

Additionally, situations can arise in which the wearable device 102 sends an indication to the wireless device 104 to launch the camera even though the user does not actually desire to launch the camera of the wireless device 104 (i.e., in the absence of a user desire to launch the camera or a lack of a user desire to launch the camera). These situations are referred to as false positives, and the anti-falsing module 126 operates to detect these false positives and take an appropriate remedial action. It should be noted that although the anti-falsing module 126 is illustrated as separate from the camera module 132, the anti-falsing module 126 can alternatively be included as part of the camera module 132.

The anti-falsing module 126 operates in response to a determination that the camera functionality of the wireless device 104 was launched in response to a user input at the wearable device 102 as opposed to being launched in response to user interaction with the wireless device 104 itself (e.g., a user touching an icon displayed on a touchscreen of the wireless device 104 or actuating a physical button of the wireless device 104). The determination that the camera functionality of the wireless device 104 was launched in response to a user input at the wearable device 102 can be made in various manners. For example, a flag or other signal can be included in or accompany the indication to launch the camera sent by the wearable device 102, the flag or other signal indicating that the camera of the wireless device 104 was launched in response to a user input at the wearable device 102. By way of another example, a flag or other signal can be included in or accompany a request to launch the camera in response to user interaction with the wireless device 104 itself, the flag or other signal indicating that the camera of the wireless device 104 was launched in response to user interaction with the wireless device 104 itself and thus the absence of the flag or other signal indicating that the camera of the wireless device 104 was launched in response to a user input at the wearable device 102.

In response to a determination that the camera of the wireless device 104 was launched in response to a user input at the wearable device 102, the anti-falsing module 126 determines whether a user is using the camera functionality. The anti-falsing module 126 can use various criteria (e.g., predetermined rules, heuristics, etc.) to determine whether a user is using the camera functionality. These criteria can include time-based criteria, such as determining that a user is not using the camera functionality unless a button (e.g. physical or touchscreen) of the wireless device 104 is touched or actuated within a threshold amount of time (e.g., 3-10 seconds) of receipt of the indication to launch the camera. These criteria can include motion or orientation criteria, such as determining that a user is not using the camera functionality unless the wireless device 104 is moved or changed to a particular orientation (e.g., held upright or at an angle as opposed to lying horizontal) within a threshold amount of time (e.g., 3-10 seconds) of receipt of the indication to launch the camera. These criteria can include user input criteria, such as displaying a user-selectable button or other element (e.g., a user-selectable "dismiss" button) and determining that a user is not using the camera functionality in response to user selection of the user-selectable button or other element. The user-selectable button or other element can also be displayed as part of a dialog or other display operating as a lock screen that allows only certain inputs (e.g., user selection of the "dismiss" button or other user input to close the dialog) while the lock screen is displayed. Thus, while the dialog or other display operating as a lock screen is displayed, the user can provide an input indicating that the user is not using the camera functionality (user selection of the "dismiss" or other button or element), or provide an input indicating that the user is using the camera functionality (e.g., user selection of another button or element to close the dialog or other display operating as a lock screen).

If the anti-falsing module 126 determines that a user is not using the camera functionality, then the anti-falsing module 126 takes an appropriate remedial action such as terminating or closing the camera (e.g., communicates a request to an operating system of the wireless device 104 to terminate execution of the camera program or otherwise shut down or close the camera). If the anti-falsing module 126 determines that a user is not using the camera functionality, then the anti-falsing module 126 also optionally returns the wireless device 104 to the mode or power state the wireless device 104 was in prior to receipt of the indication to launch the camera. The mode or power state that the wireless device 104 was in prior to receipt of the indication to launch the camera can be determined in various manners, such as being provided to the anti-falsing module 126 by an operating system of the wireless device 104, being stored in a configuration register or other setting of the wireless device 104, being assumed by the anti-falsing module 126, and so forth. For example, the anti-falsing module 126 can return the wireless device to a sleep or other low power mode (e.g., communicates a request to an operating system of the wireless device 104 to put the wireless device 104 to sleep or in another low power mode). By returning the wireless device 104 to a sleep or other low power mode, battery power of the wireless device 104 ceases to be expended due to the false positive (e.g., the screen of the wireless device 104 is turned off).

Figure 4:
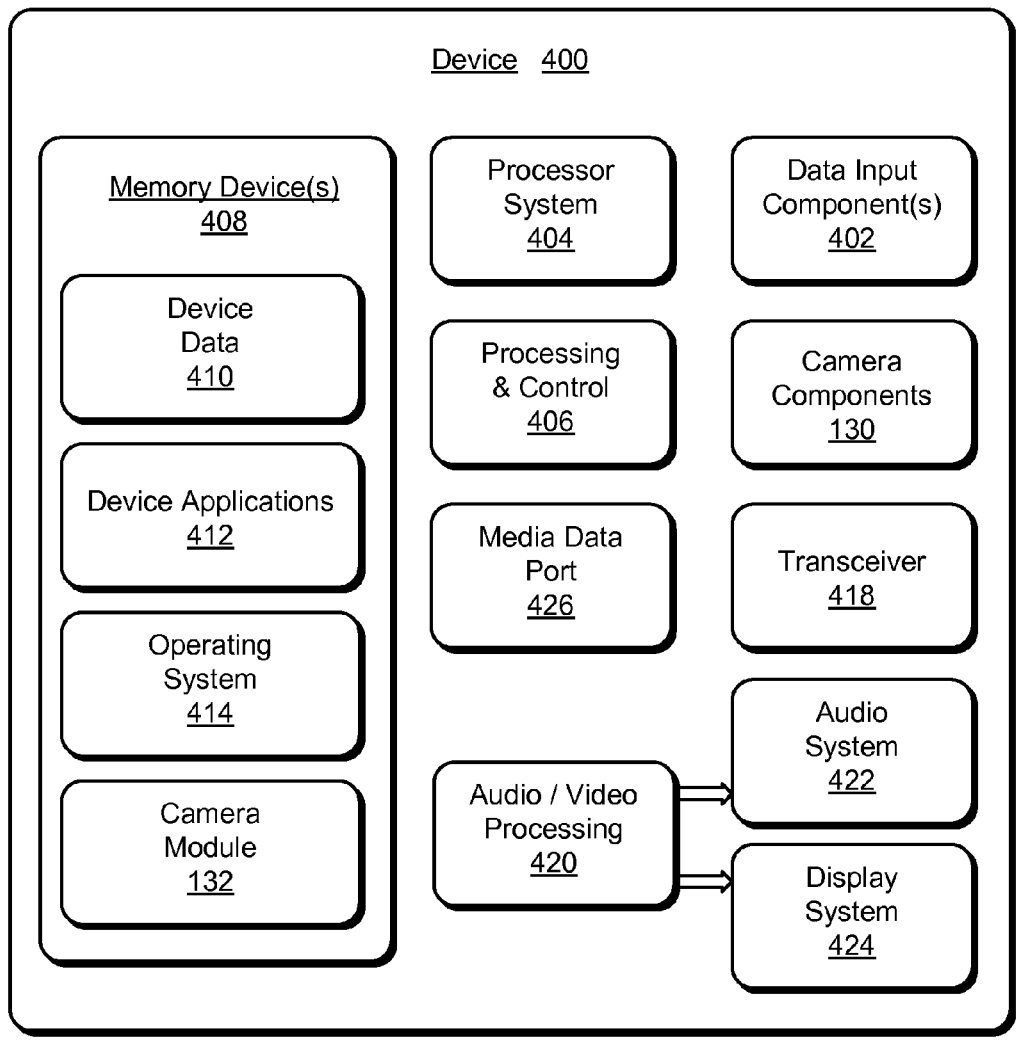
FIG. 4 illustrates an example electronic device that can implement embodiments of the techniques discussed herein.

FIG. 4 illustrates various components of an example electronic device 400 that can be implemented as a wireless device as described with reference to any of the previous FIGS. 1-3. The device can be a wireless device 104 of FIG. 1, and may be implemented as any one or combination of a fixed or mobile device in any form of a consumer, computer, portable, user, communication, phone, navigation, gaming, messaging, Web browsing, paging, media playback, or other type of electronic device.

The electronic device 400 can include one or more data input components 402 via which any type of data, media content, or inputs can be received such as user-selectable inputs, messages, music, television content, recorded video content, and any other type of audio, video, or image data received from any content or data source. The data input components 402 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 402 may also include various other input components such as microphones, touch sensors, keyboards, and so forth.

The electronic device 400 of this example includes a processor system 404 (e.g., any of microprocessors, controllers, and the like) or a processor and memory system (e.g., implemented in a system on a chip), which processes computer-executable instructions to control operation of the device. A processing system may be implemented at least partially in hardware that can include components of an integrated circuit or on-chip system, an application-specific integrated circuit, a field-programmable gate array, a complex programmable logic device, and other implementations in silicon or other hardware. Alternatively or in addition, the electronic device can be implemented with any one or combination of software, hardware, firmware, or fixed-logic circuitry implemented in connection with processing and control circuits that are generally identified at 406. Although not shown, the electronic device can include a system bus or data transfer system that couples the various components within the device. A system bus can include any one or combination of different bus structures such as a memory bus or memory controller, a peripheral bus, a universal serial bus, or a processor or local bus that utilizes any of a variety of bus architectures.

The electronic device 400 also includes one or more memory devices 408 that enable data storage such as random access memory, non-volatile memory (e.g., read-only memory, flash memory, erasable programmable read-only memory, electrically erasable programmable read-only memory, etc.), and a disk storage device. A memory device 408 provides data storage mechanisms to store the device data 410, other types of information or data, and various device applications 412 (e.g., software applications). For example, an operating system 414 can be maintained as software instructions within a memory device and executed by the processor system 404.

In embodiments the electronic device 400 also includes a camera module 132 and camera components 130 of a camera described with reference to FIGS. 1-3. Although represented as a software implementation, the camera module 132 may be implemented as any form of a control application, software application, control module, firmware that is installed on the device, a hardware implementation of the camera module, and so on.

The electronic device 400 also includes a transceiver 418 that supports wireless communication with other devices or services allowing data and control information to be sent as well as received by the device 400. The wireless communication can be supported using any of a variety of different public or proprietary communication networks or protocols such as cellular networks (e.g., third generation networks, fourth generation networks such as Long Term Evolution networks), wireless local area networks such as Wi-Fi networks, Bluetooth, and so forth.

The electronic device 400 can also include an audio or video processing system 420 that processes audio data or passes through the audio and video data to an audio system 422 or to a display system 424. The audio system or the display system may include any devices that process, display, or otherwise render audio, video, display, or image data. Display data and audio signals can be communicated to an audio component or to a display component via a radio frequency link, S-video link, HDMI (high-definition multimedia interface), composite video link, component video link, DVI (digital video interface), analog audio connection, or other similar communication link, such as media data port 426. In implementations the audio system or the display system are external components to the electronic device. Alternatively or in addition, the display system can be an integrated component of the example electronic device, such as part of an integrated touch interface.

Figure 5:
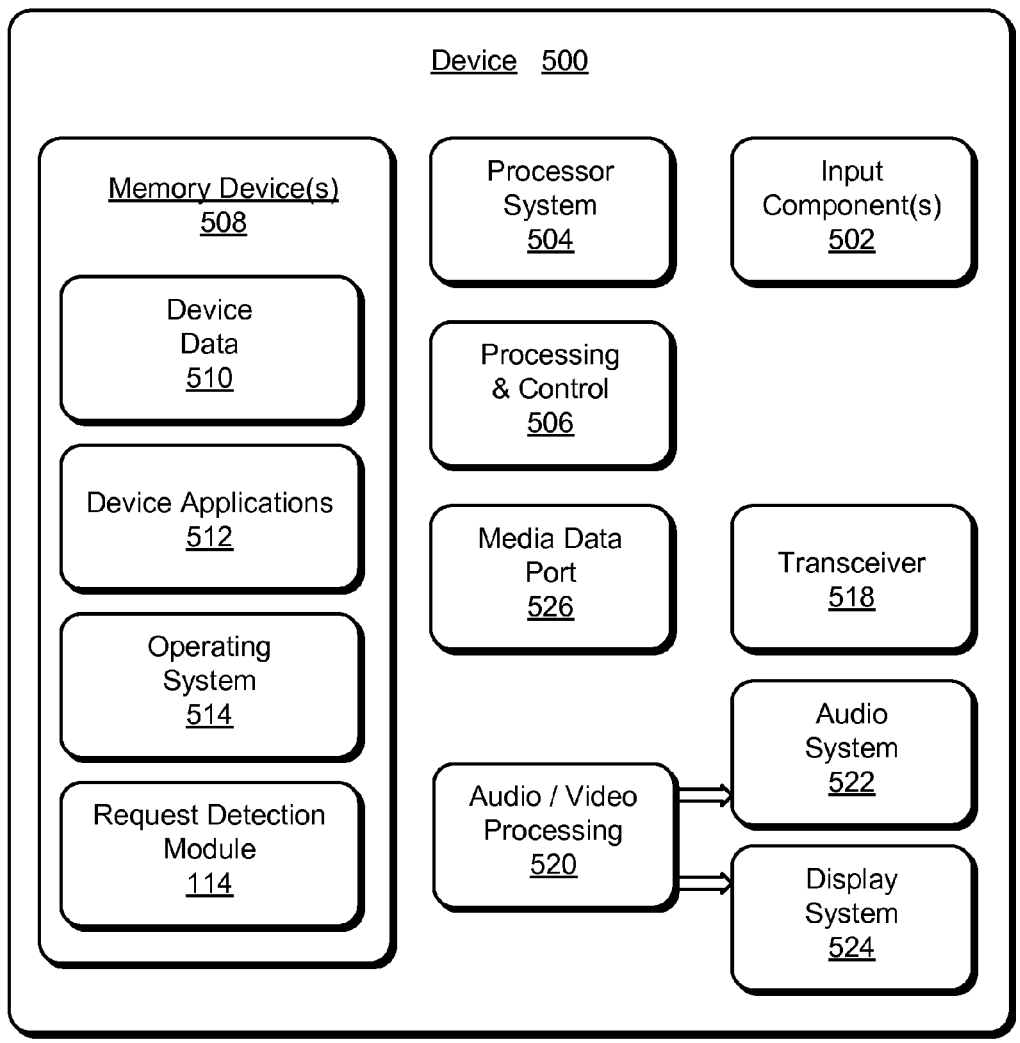
FIG. 5 illustrates another example electronic device that can implement embodiments of the techniques discussed herein.

FIG. 5 illustrates various components of an example electronic device 500 that can be implemented as a wearable device as described with reference to any of the previous FIGS. 1-3. The device can be a wireless device 102 of FIG. 1, and may be implemented as any one or combination of devices that can be worn by a user.

The electronic device 500 can include one or more input components 502 via which any type of data, media content, or user inputs can be received such as user-selectable inputs, gestures, messages, music, any type of audio, video, or image data received from any content or data source. The data input components 502 may include various data input ports used to couple the electronic device to components, peripherals, or accessories such as keyboards or microphones. The data input components 502 may also include various other input components such as microphones, touch sensors, keyboards, and so forth.

The electronic device 500 of this example includes a processor system 504 (e.g., any of microprocessors, controllers, and the like) or a processor and memory system (e.g., implemented in a system on a chip), which processes computer-executable instructions to control operation of the device. A processing system may be implemented at least partially in hardware that can include components of an integrated circuit or on-chip system, an application-specific integrated circuit, a field-programmable gate array, a complex programmable logic device, and other implementations in silicon or other hardware. Alternatively or in addition, the electronic device can be implemented with any one or combination of software, hardware, firmware, or fixed-logic circuitry implemented in connection with processing and control circuits that are generally identified at 506. Although not shown, the electronic device can include a system bus or data transfer system that couples the various components within the device. A system bus can include any one or combination of different bus structures such as a memory bus or memory controller, a peripheral bus, a universal serial bus, or a processor or local bus that utilizes any of a variety of bus architectures.

The electronic device 500 also includes one or more memory devices 508 that enable data storage such as random access memory, non-volatile memory (e.g., read-only memory, flash memory, erasable programmable read-only memory, electrically erasable programmable read-only memory, etc.), and a disk storage device. A memory device 508 provides data storage mechanisms to store the device data 510, other types of information or data, and various device applications 512 (e.g., software applications). For example, an operating system 514 can be maintained as software instructions within a memory device and executed by the processor system 504.

In embodiments the electronic device 500 also includes a request detection module 114 described with reference to FIGS. 1-3. Although represented as a software implementation, the request detection module 114 may be implemented as any form of a control application, software application, control module, firmware that is installed on the device, a hardware implementation of the request detection module, and so on.

The electronic device 500 also includes a transceiver 518 that supports wireless communication with other devices or services allowing data and control information to be sent as well as received by the device 500. The wireless communication can be supported using any of a variety of different public or proprietary communication networks or protocols such as cellular networks (e.g., third generation networks, fourth generation networks such as Long Term Evolution networks), wireless local area networks such as Wi-Fi networks, Bluetooth, and so forth.

The electronic device 500 can also include an audio or video processing system 520 that processes audio data or passes through the audio and video data to an audio system 522 or to a display system 524. The audio system or the display system may include any devices that process, display, or otherwise render audio, video, display, or image data. Display data and audio signals can be communicated to an audio component or to a display component via a radio frequency link, S-video link, HDMI, composite video link, component video link, DVI, analog audio connection, or other similar communication link, such as media-data port 526. In implementations the audio system or the display system are external components to the electronic device. Alternatively or in addition, the display system can be an integrated component of the example electronic device, such as part of an integrated touch interface.

Although embodiments of techniques for launching a camera of a wireless device from a wearable device have been described in language specific to features or methods, the subject of the appended claims is not necessarily limited to the specific features or methods described. Rather, the specific features and methods are disclosed as example implementations of techniques for launching a camera of a wireless device from a wearable device.

The invention claimed is:

1. A system comprising:
 a wearable device configured to:
  receive an input at the wearable device, the wireless device and the wearable device being separate devices; and
  send, in response to the input, an indication to the wireless device to launch the camera of the wireless device; and
 the wireless device configured to:
  receive from the wearable device the indication to launch the camera, the wearable device being separate from the wireless device;
  launch the camera in response to the received indication;
  detect whether the indication was received in an absence of a user desire to launch the camera; and
  execute a remedial action in response to the received indication being detected without the user desire to launch the camera, wherein being detected without the user desire to launch the camera comprises at least one of:
   the camera not being used within a threshold amount of time of receipt of the indication; or
   an absence of movement or change to a particular orientation of the wireless device within the threshold amount of time of receipt of the indication.

2. The system of claim 1, the input comprising a gesture that is a particular movement or sequence of movements of the wearable device.

3. The system of claim 1, the input comprising a particular audible input received by a microphone of the wearable device.

4. The system of claim 1, the input comprising a particular touch sequence or pattern traced on a touchscreen of the wearable device.

5. The system of claim 1, the sending the indication comprising sending the indication via a Bluetooth connection.

6. The system of claim 1, wherein the wireless device is configured to open a shutter of the wireless device and run a camera program on the wireless device.

7. The system of claim 1, wherein the remedial action comprises a termination of execution of a camera program of the wireless device.

8. A method comprising:
 receiving, by a wearable device, an input, the wearable device being separate from the wireless device;
 sending, by the wearable device and in response to the input, an indication to the wireless device to launch the camera of the wireless device;

receiving, by the wireless device and from a wearable device, the indication to launch the camera of the wireless device, the wireless device being separate from the wearable device;

detecting, by the wireless device, whether the indication was received in the absence of a user desire to launch the camera;

launching, by the wireless device, the camera of the wireless device in response to the received indication; and executing, by the wireless device, a remedial action in response to the received indication being detected without a user desire to launch the camera, wherein being detected without a user desire to launch the camera comprises at least one of:

the camera not being used within a threshold amount of time of receipt of the indication; or the absence of movement or change to a particular orientation of the wireless device within a threshold amount of time of receipt of the indication.

9. The method of claim 8, the wearable device comprising a smartwatch.

10. The method of claim 8, the launching the camera comprising opening a shutter of the wireless device and running a camera program on the wireless device.

11. The method of claim 8, the input comprising a gesture that is a particular movement or sequence of movements of the wearable device.

12. The method of claim 8, wherein executing the remedial action comprises terminating execution of a camera program of the wireless device.

13. A wireless device comprising:
a camera including a camera module and one or more camera components;
a communication module configured to receive from a wearable device an indication for the wireless device to launch the camera, the wearable device being separate from the wireless device;
an anti-falsing module configured to detect whether the indication was received in the absence of a user desire to launch the camera;
a camera launch module configured to launch the camera in response to the received indication; and
wherein the anti-falsing module is configured to execute a remedial action in response to the received indication being detected without a user desire to launch the camera, wherein being detected without a user desire to launch the camera comprises at least one of:
the camera not being used within a threshold amount of time of receipt of the indication; or
the absence of movement or change to a particular orientation of the wireless device within a threshold amount of time of receipt of the indication.

14. The wireless device of claim 13, the camera launch module being configured to launch the camera of the wireless device in response to the received indication and prior to a user touching the wireless device in order to use the camera.

15. The wireless device of claim 13, the launching the camera including running the camera module.

16. The wireless device of claim 13, wherein being detected without a user desire to launch the camera further comprises at least one of:

the camera not being used within a threshold amount of time of receipt of the indication; or the absence of movement or change to a particular orientation of the wireless device within a threshold amount of time of receipt of the indication; or the indication for the wireless device to launch the camera being received in the absence of a user desire to launch the camera in response to user selection of a user-selectable element displayed by the wireless device.

17. The wireless device of claim 13, wherein the remedial action comprises a termination of execution of a camera program of the wireless device.

18. A method implemented in a wireless device, the method comprising:

receiving from a wearable device an indication for the wireless device to launch a camera of the wireless device, the wireless device being separate from the wearable device;

detecting whether the indication was received in the absence of a user desire to launch the camera;

launching the camera of the wireless device in response to the received indication; and executing a remedial action in response to the received indication being detected without a user desire to launch the camera, wherein being detected without a user desire to launch the camera comprises at least one of:

the camera not being used within a threshold amount of time of receipt of the indication; or the absence of movement or change to a particular orientation of the wireless device within a threshold amount of time of receipt of the indication.

19. The method of claim 18, the launching the camera comprising opening a shutter of the wireless device and running a camera program on the wireless device.

20. The method of claim 18, the launching the camera comprising launching the camera in response to the received indication and prior to a user touching the wireless device in order to use the camera.

21. The method of claim 18, the remedial action comprising terminating execution of a camera program of the wireless device.

* * * * *